(12) United States Patent
Les Aguerrea et al.

(10) Patent No.: US 11,953,236 B2
(45) Date of Patent: Apr. 9, 2024

(54) CHARACTERIZATION DEVICE FOR CHARACTERIZING THE QUALITY OF LIGHT BEAMS REFLECTED FROM A SURFACE OF A REFLECTIVE ELEMENT AND METHOD THEREFOR

(71) Applicant: FUNDACIÓN CENER-CIEMAT, Sarriguren (ES)

(72) Inventors: Iñigo Les Aguerrea, Navarra (ES); Amaia Mutuberria Larrayoz, Navarra (ES); Adrian Peña Lapuente, Navarra (ES); Marcelino Sanchez Gonzalez, Navarra (ES); Carlos Heras Vila, Saragossa (ES); Iñigo Salina Áriz, Saragossa (ES); David Izquierdo Núñez, Saragossa (ES); Javier Garcia-Barberena Labiano, Navarra (ES)

(73) Assignee: FUNDACIÓN CENER-CIEMAT, Sarriguren (ES)

( * ) Notice: Subject to any disclaimer, the term of this patent is extended or adjusted under 35 U.S.C. 154(b) by 442 days.

(21) Appl. No.: 17/262,330

(22) PCT Filed: Jul. 25, 2019

(86) PCT No.: PCT/ES2019/070524
§ 371 (c)(1),
(2) Date: Jan. 22, 2021

(87) PCT Pub. No.: WO2020/021147
PCT Pub. Date: Jan. 30, 2020

(65) Prior Publication Data
US 2021/0318033 A1    Oct. 14, 2021

(30) Foreign Application Priority Data

Jul. 25, 2018 (ES) .................................. 201830756

(51) Int. Cl.
*G01B 9/00* (2006.01)
*F24S 20/20* (2018.01)
(Continued)

(52) U.S. Cl.
CPC ............... *F24S 50/80* (2018.05); *F24S 20/20* (2018.05); *F24S 23/30* (2018.05); *G01B 9/00* (2013.01);
(Continued)

(58) Field of Classification Search
CPC .. F24S 50/80; F24S 20/20; F24S 23/30; F24S 2050/25; G01B 9/00; G01B 11/00; G01J 1/0411; Y02E 10/40
(Continued)

(56) References Cited

U.S. PATENT DOCUMENTS 8,664,577 B1 * 3/2014 Ghanbari ................ F24S 23/30
250/205
83,664,577        3/2014 Ghanbari
(Continued)

FOREIGN PATENT DOCUMENTS

WO    2015/117192 A1    8/2015
WO    2016/110606 A1    7/2016
WO    WO-2016110606 A1 *    7/2016    .............. F24S 20/20

OTHER PUBLICATIONS

Written opinion for PCI/ES2019/070524 dated Dec. 9, 2019.
(Continued)

*Primary Examiner* — Thanh Luu
*Assistant Examiner* — Mai Thi Ngoc Tran
(74) *Attorney, Agent, or Firm* — Sughrue Mion, PLLC

(57) ABSTRACT

A characterization device, system, and method for characterizing reflective elements from the light beams reflected in it. The device has two variable-gain detectors on a common structure, which can be portable or fixed, and for capturing
(Continued)

light beams reflected by a reflective element, and from at least one processor characterizing the quality of the reflected light beams and evaluating the quality of the reflective element from its reflective capacity. Each detector has a lens for increasing the signal-to-noise ratio of the reflected beam or beams, a light sensor on which the beam or beams captured by the lens are focused, an automatic gain selection system associated with the optical sensor, and a data communication device associated with the device itself. A characterization system and a characterization method for characterizing reflective elements from the quality of the light beams reflected in at least one reflective element or heliostat.

18 Claims, 7 Drawing Sheets

(51) Int. Cl.
  *F24S 23/30* (2018.01)
  *F24S 50/20* (2018.01)
  *F24S 50/80* (2018.01)
  *G01J 1/04* (2006.01)
(52) U.S. Cl.
  CPC ......... *G01J 1/0411* (2013.01); *F24S 2050/25* (2018.05)
(58) Field of Classification Search
  USPC ..................................................... 250/203.4
  See application file for complete search history.

(56) References Cited

U.S. PATENT DOCUMENTS

| | | | |
|---|---|---|---|
| 9,482,583 B1* | 11/2016 | Zavodny | G01M 11/005 |
| 2008/0295883 A1 | 12/2008 | Ducellier | |
| 2010/0031952 A1* | 2/2010 | Zavodny | F24S 23/70 |
| | | | 126/573 |
| 2010/0139644 A1 | 6/2010 | Schwarzbach | |
| 2010/0206302 A1* | 8/2010 | Cheung | H02S 40/22 |
| | | | 126/694 |
| 2013/0239952 A1 | 9/2013 | Kroyzer | |

OTHER PUBLICATIONS

International search report for PCI/ES2019/070524 dated Dec. 9, 2019.
Goldberg, N. & Zisken, A., (2015). Heliostat Surface Estimation by Image Processing. Energy Procedia. 69. 1885-1894. 10.1016/j.egypro.2015.03.171.
Andraka, Charles & Yellowhair, Julius. (2019). AIMFAST for heliostats: Canting tool for long focal lengths. AIP Conference Proceedings. 2126. 030003. 10.1063/1.5117515.
S. Schedler et al., "From research to industry: Development of a high-resolution measurement system for mirrored heliostats in series production," Casablanca, Morocco, 2019, p. 030051. doi: 10.1063/1.5117563.
Rafael Monterreal, Raul Enrique, Jesús Fernández-Reche; An improved methodology for heliostat testing and evaluation at the Plataforma Solar de Almeria. AIP Conference Proceedings Jun. 27, 2017; 1850 (1): 030036. https://doi.org/10.1063/1.4984379.
A.M. Bonanos, M. Faka, D. Abate, S. Hermon, M.J. Blanco, Heliostat surface shape characterization for accurate flux prediction, Renewable Energy, vol. 142, 2019, pp. 30-40, ISSN 0960-1481, https://doi.org/10.1016/j.renene.2019.04.051.
Quéau, Y., Durou, JD. & Aujol, JF. Normal Integration: A Survey. J Math Imaging Vis 60, 576-593 (2018). https://doi.org/10.1007/s10851-017-0773-x.
Blanco, M.J., Amieva, J.M., Mancilla, A., 2005. The Tonatiuh Software Development Project: An open source approach to the simulation of solar concentrating systems, in: Proceedings of the ASME Computers and Information in Engineering Division. pp. 157-164. doi:10.1115/IMECE2005-81859.

* cited by examiner

CHARACTERIZATION DEVICE FOR CHARACTERIZING THE QUALITY OF LIGHT BEAMS REFLECTED FROM A SURFACE OF A REFLECTIVE ELEMENT AND METHOD THEREFOR

CROSS-REFERENCE TO RELATED APPLICATIONS

This application is a National Stage of International Application No. PCT/ES2019/070524 filed Jul. 25, 2019, which claims priority under U.S.C. § 119(a) to Spanish Patent Application No. P201830756 filed on Jul. 25, 2018.

OBJECT OF THE INVENTION

The present invention relates to a characterization device for characterizing reflective elements, preferably heliostats, from the light beams reflected therein and specifically from the quality of said light beams. The device comprises at least two variable-gain detectors arranged on a common structure, which can be portable or fixed, and arranged for capturing the light beams reflected by at least one reflective element or heliostat, and from a local processor or local processing and data capture unit, characterizing the quality of said reflected light beams and therefore evaluating the quality of the reflective element or heliostat from its reflective capacity. Likewise, each detector comprises a lens for increasing the signal-to-noise ratio of the reflected beam, an optical sensor on which the beam captured by the lens is focused, an automatic gain selection system associated with the optical sensor, and data communication means associated with the detector itself. Likewise, the invention relates to a characterization system and to a characterization method for characterizing reflective elements, heliostats, from the quality of the light beams reflected in at least one heliostat. Complementarily, the characterization device comprises a pin-hole camera system with at least one pin-hole camera, a processing unit, an image storage unit and, optionally, communication means for sending said images and a camera orientation system.

The invention is particularly applicable in the concentrating solar power sector in the characterization of reflective elements or heliostats.

DESCRIPTION OF THE STATE OF THE ART

Current measurement systems for measuring the quality of the solar beam reflected by the reflective elements, mainly heliostats, in tower solar plants are mainly based on the use of white screens or targets where the reflected beam is projected while said target is captured by optical cameras. Subsequently, the shape of the reflected beam is taken out of the images by means of image analysis methods and the heliostat is characterized by means of, for example, combined optimization and ray tracing techniques, usually obtaining two figures of merit for the quality of the heliostat: the mean deviations in the orientation of the surface of the reflector on the main axes of the heliostat, with it being impossible to obtain the exact shape and deformations thereof since there is no one-to-one correspondence, i.e., multiple configurations of the surface of the heliostat give rise to the same capture of the reflected beam. This last step is adjusted depending on the type of measurements obtained, limiting the results and/or the figures of merit that are obtained and associated with the characterization of the heliostat. As a result, they are the capture system and method for capturing the shape of the beam object of the invention. In the present invention, reflective elements and heliostats are interchangeably referred to, such that they must be interpreted according to their broadest meaning.

Therefore, in the state of the art there are known characterization systems for characterizing heliostats in tower solar plants based on cameras which capture the image of the beam reflected by each heliostat on a target in measurement times that are short enough so that the movement of the sun does not affect the measurement. However, these systems have limitations which only allow them to measure the beam reflected by heliostats that are close to the tower of the heliostat field and do not allow the characterization of heliostats when any of the following conditions is met:

- the beams of the heliostats are very large and require excessively large targets, where it is unfeasible in practice to construct a large sized screen in economic terms,
- the amount of light reflected by the target is insufficient for the measurement because it competes with the ambient light, which is a technical limitation, and
- the target is directly illuminated by other sources having an intensity similar to the light reflected by the heliostat, for example, the sun, competing with one another, which also represents a technical limitation.

The first two limitations are caused by several factors, with the distance from the heliostat to the target being the most significant determining factor, increasing said distance increases the size of the beam, distributing the same amount of light in a larger area, so decreasing the light intensity, per unit area, reflected by the target and captured by the camera. The third limitation mostly affects heliostats located to the south of the tower, assuming it is in the northern hemisphere, since the direct incidence of the sun increases the amount of light in the target, preventing its characterization. For heliostats to the north, the target is in shade most of the day and this problem does not apply. Hereinafter, heliostats that comply with any of these limitations and cannot be characterized with the methods of the state of the art are referred to as far heliostats, taking the distance of 800 m as the reference distance and current approximate limit of these methods.

Primarily due to these reasons, the systems known in the state of the art have limitations and do not allow the characterization of all the heliostats located in fields in vast extensions of terrain.

A system for characterizing far heliostats located more than 800 meters away from the tower of the heliostat field based on columns of collimated sensors is known (pages 12 and 13 of http://prod.sandia.gov/techlib/access-control.cgi/2013/135492.pdf). This system uses the movement of a motor of the heliostat to sweep the reflected beam across a column of collimated sensors. This system requires the orientation and adjustment of each sensor for each location of the heliostat, which requires a great deal of knowledge and control of the motor moving the heliostat, as well as the deviation and precision thereof at all times, and being limited in dynamic measurement range for specific distances of the heliostat being characterized. Furthermore, this system must take the measurement at faster times to prevent errors due to the movement of the sun, the turning of the heliostat competing with the movement of the sun. However, like the previous system, this is not suitable for the characterization of a heliostat field mainly for two reasons also:

- because there are close and far heliostats in a heliostat field and the sensor system thereof does not allow being oriented and adapted to the different incident light intensities caused by the different locations of each heliostat rapidly, and because it is not possible to know the deviations of each turning motor of all the field heliostats in the step by step movement thereof, which gives rise to uncontrolled errors in the measurement of each heliostat and an unreliable characterization.

Therefore, the previous systems are valid in the case in which the reflected power is above ambient light and are reliable in the case of heliostats located at distances of less than 800 meters, but they stop being reliable when the distance between the heliostat and the target is greater than 800 meters, or for the heliostats that are mainly located in the southern part of a plant erected in the northern hemisphere. In fact, for these distances greater than 800 meters, the size of the beam can be up to 30 m×30 m, such that the optical density projected on the targets and captured by the camera is comparable with ambient light, making it impossible or largely hindering the measurement of the concentrating quality of the heliostat. In the same manner, the column of collimated sensors technique allows characterizing only far heliostats (more than 800 m) or only close heliostats, but not both at the same time as they do not have sensors that can be adapted to the incident light.

In the state of the art, document US20100139644A1 describe a characterization system for characterizing heliostats with a device made up of an array of light sensors capable of measuring the light reflected by heliostats. Like the systems described above, it has the following drawbacks when it is applied to the characterization of a heliostat field:

the sensors capture all the incident hemispheric light, introducing noise in the measurements and making it impossible to characterize heliostats that are located to the south of the tower (the reflected beam competes with direct sunlight on the measurement device) or when the light intensity reflected by the heliostat is low and has a level similar to or less than the level of albedo, i.e., far and/or small heliostats, optical sensors do not have an adjustment system for adjusting the measurement range, making it impossible to characterize heliostats with light intensities reflected in different ranges, as occurs, for example, when comparing the beams reflected by far and close heliostats, and the reflected beam goes through the sensors by using the motors of the heliostat, operated by the control system of the heliostat, leading to uncertainties and errors in the measurement as a consequence of using said motors.

Thus, the systems known in the state of the art have the following drawbacks:

They present errors resulting from the fact that the scanning of the heliostats is not always uniform and constant as a consequence of motor precision, They present errors as a consequence of the distance between the heliostat and the tower in which the characterization system is arranged, mainly in those measurements of heliostats located far from the tower, They present errors resulting from the amount or intensity of the light when it competes with ambient light when this is reflected in heliostats far away from the characterization system or when they compete with direct sun light in heliostats to the south, and They do not allow characterizing heliostats that generate beams with light intensities in different ranges as they do not have a system which adjusts the measurement range, making it impossible to characterize an entire heliostat field.

Therefore, the present invention proposes a characterization device, system, and method for characterizing reflective elements, mainly heliostats, that solves the problems existing in characterization systems of the state of the art. The device and system objects of the present invention seek to improve current devices and systems to enable the characterization of the quality of the beams reflected by a heliostat regardless of its position in the field and for any distance, by means of:

The use of the movement of the sun to achieve uniform, constant, and error-free scanning of the beam to be characterized by the characterization device object of the present invention, The adjustment of the dynamic measurement range of the sensors to enable the characterization of heliostats at any distance from the heliostat, The inclusion of light capture optics in each sensor to multiply the amount of useful light detected, improving the quality (ratio of useful light and ambient light) of the measurements at any distance from the heliostat; the useful signal being the sun light reflected by the heliostat, and preventing the capture of unwanted light sources, such as direct sun light, for example, when characterizing heliostats located to the south, and The optional and complementary inclusion of a system with at least one pin-hole camera providing additional information about the orientation of the reflective elements along the surface thereof, improving the analysis capacity and reducing uncertainty in the characterization of the heliostat.

DESCRIPTION OF THE INVENTION

The object of the present invention is a characterization device for characterizing reflective elements (in the present description, heliostats will be taken as an example) from the light beams reflected by them, and specifically from the quality of said light beams, as well as a characterization system and a characterization method for characterizing said reflective elements.

The present invention is based on the use of the movement of the sun as a scanning element for scanning the light beam reflected by the heliostats, which remain immobile throughout the entire measurement process, on a structure with at least two detectors, thereby assuring a uniform, constant scanning that is stepless and has no deviations or errors, as occurs when a characterization system based on the movement of the heliostats is used. Thus, the present invention is independent of, throughout the measurement process, the movements caused by the turning motors of the heliostats in the field, and eliminates any type of error, deviation, or lack of scanning uniformity due to said turning motors of the heliostats or the dynamic deformations of the structure of the heliostat, thereby allowing a precise characterization of the reflected beam for each position of the heliostat. Specifically, the present invention has, as a first object, a characterization device according to claim 1. The device object of the invention uses light capture optics in the detectors for increasing the amount of light coming from the heliostat in the optical sensor, reducing the noise introduced by external sources (for example ambient light or direct radiation of the sun), thus assuring the correct measurement both in far heliostats, at more than 800 meters from the characterization device, and close heliostats, or even those that tend to be located to the south of the tower and its reflected beam would compete with direct sun light (hereinafter assuming a plant located in the northern hemisphere), and without the need for a fine aiming adjustment of the detector towards the heliostat. Likewise, the device uses a variable-gain amplification system associated with the sensor for adjusting each sensor of the detector or selecting the suitable sensor in the detector in an automated manner with respect to the incident radiation, enabling a dynamic range that is large and sensitive enough for assuring the correct characterization of the entire field. This is a relevant aspect considering the vast extension of terrain that heliostat fields of the most recently constructed commercial plants occupy, reaching distances between tower and heliostats of up to 1600 m in plan view, generating incident radiations that vary greatly between the closest and farthest heliostats, where the reflected beam tends to be distributed in a larger area which is proportional to the square of the distance.

The device, which is the first object of the invention, comprises at least two variable-gain detectors located on a structure for receiving the light beam reflected by at least one heliostat, wherein each detector of the device comprises:
a lens for increasing the signal-to-noise ratio of the beam,
at least one optical sensor on which the beam captured by the lens is focused,
an automatic gain selection system associated with the optical sensor, with gain electronics and a local processor or local processing and data capture unit, and
data communication means associated with the detector.

For the purpose of the present description, variable-gain detector is considered as any device capable of measuring incident light with a suitable range for allowing a correct measurement.

Preferably the lenses of the detectors are convergent lenses, and the optical sensors are silicon photodiodes, although they could also be inGaAs (indium gallium arsenide) photodiodes, thermopiles, etc.

Thus, the detectors of the device incorporate a lens as a focusing optic with a preferably small aperture angle, for example, less than 15°, concentrating the incident light of the detector in the sensor. This achieves not only an improved operation of the sensor, but also, as a result of the lens, the reduction of the aperture angle of the detector, decreasing in this way the capture of unwanted light sources which would otherwise introduce a large amount of noise and invalidate the measurement. For example, the use of the lens allows characterizing heliostats arranged to the south of the tower by avoiding the contribution of direct sun light, provided that the sun, the heliostat, and the optical axis of the device are not coplanar and the angle between sun and said axis is greater than half the aperture angle of the lens, which is a situation that mostly occurs throughout the day if the suitable optic is selected. Furthermore, the use of the lens reduces the captured ambient light and increases the amount of useful light coming from the heliostat, and captured in the detector, towards the sensor. The useful signal to ambient light ratio of the system is thereby increased by a factor, which is contribution of the ratio of the sensor area and lens area and the reduction of the aperture angle between 50 and 100 with respect to systems of the state of the art based on cameras and collimated sensors, achieving a noise reduction in the measurement of the same order. Likewise and in the event of having several devices, as a result of the lenses of the detectors, heliostats can be characterized simultaneously, one for each device, without the beams reflected by the heliostats being characterized interfering with one another, provided that the devices and the heliostats to be characterized are arranged and selected in a reasonable manner.

Given the size of the beam to be characterized coming from a heliostat located at more than 800 meters from the characterization device, the detectors will preferably be placed in the form of a vertical array on a structure, and the movement of the sun will be utilized so that the actual beam reflected by the heliostat, which remains immobile throughout the entire scanning time, is swept across the array of detectors, performing the scan as a consequence of the movement of the sun. The real-time capture of the signal of the detectors will outline the shape of the beam on the horizontal axis, and in the event of beam sizes that are larger than the array of detectors, in the vertical dimension, more scans will be necessary, with given movements of the heliostat in elevation to outline the entire beam, these movements being determined and performed while the intensity of the reflected beam is not being measured.

Likewise, as mentioned above, the detectors comprise an automatic gain selection system associated with the optical sensor, formed by gain electronics associated with the sensor and a local processor, or local processing and data capture unit, for selecting or adjusting the gain most suited to the intensity of the received light. The objective of this system is to select or adjust the gain of the detector, in an automated manner, as a result of the local processor associated with each detector and therefore with each sensor, with respect to the incident radiation reflected by the heliostat, which is indispensable for a dynamic range measurement and is adaptable and sensitive to the needs of all the heliostats in the field.

The automatic gain selection system of each detector may comprise variable-gain electronics or fixed-gain electronics or logarithmic-gain electronics. If the detector comprises a single optical sensor, said sensor will be a photodiode or a thermopile, such that the variable-gain electronics of the automatic gain system will select or adjust in said sensor the gain most suited to the light intensity of the beam received by said sensor or detector. On the contrary, if the detector comprises at least two optical sensors, the variable-gain electronics of the automatic gain system will select, from the at least two sensors, the sensor that has the fixed gain most suited to the light intensity of the beam received by the sensors, i.e., the variable-gain of the system is determined by the arrangement of at least two fixed-gain sensors from which the electronics selects. In the case of logarithmic-gain electronics, there will be a variable log parameter detector (equivalent to the single-detector variable-gain system), or at least two detectors with different log parameters from which will be selected the most suitable one for the incident light intensity (equivalent to the system with at least two detectors with a different gain).

For the preceding purposes, it is considered that a detector with several independent fixed-gain sensors is equivalent to a sensor with several independent fixed-gain photodiodes or thermopiles.

To facilitate system calibration and maintenance tasks, the preferably vertical structure in which the array of detectors is placed may be fixed or portable, but it will preferably be collapsible, such that it can be laid on the ground when activities are not being carried out, and it may furthermore be dismountable. The tasks of raising and collapsing the final system must be monitored and an effort must be made to prevent the need for working at heights during the use of the system. The system must incorporate suitable control software, measurement capture, and a graphical representation interface. Likewise, the array or arrays of detectors may be incorporated in the tower of the heliostat solar field or in another fixed structure (of the heliostat solar field itself or independent of same) as a preferred form of application.

In addition to the local processor, or a local processing and capture unit, of each detector, in charge of controlling the functions and measurements of each detector, each of these processors will preferably be connected with a global or general processor of the device associated with data communication means.

Likewise, the detectors can be arranged on the structure following different patterns, either aligned vertically or horizontally or aligned forming an array. Said detectors are spaced apart from one another a sufficient distance so that the resolution in the reconstruction of the reflected beam allows a precise analysis and post-processing, for any distance from the heliostat, and this separation distance between detectors preferably ranges from 0.5-1 m.

The device or the detectors installed therein may comprise automatic orientation means, such that either the structure support of the device moves, preferably rotating and changing the orientation of all the detectors at the same time, or each detector moves or rotates independently with respect to the structure of the device.

A tool will be provided with this system for the characterization of the concentrating capacity of tower solar plant heliostats at any distance, and particularly for example more than 800 m and preferably more than 1 km, improving current systems.

Alternatively, the device object of the invention may complementarily comprise a system with at least one pin-hole camera, also called a stenopeic camera or camera obscura. In addition to at least said camera, the system incorporates a processing unit, an image storage unit and, optionally, communication means for sending said images, and a orientation system for orienting the at least one camera. These cameras are known and originally consisted of a lightproof case with just a small hole where light enters and a photosensitive material on which said light is projected. The photosensitive material has been replaced today by image sensors, generally CMOS or CCD image sensors, resembling a digital camera in use, but without comprising a lens. Alternatively, digital cameras could also be used, the latter being understood as an extension of a pin-hole camera. The system may be incorporated in the device, specifically in the structure of the detectors. In the event that the system comprises a single pin-hole camera, that latter is preferably situated in the center of the characterization device, aligned with the detectors. If the pin-hole camera system comprises more cameras, they are preferably distributed following a pattern similar to that of the detectors in the device. Likewise, the pin-hole camera system will take images continuously and simultaneously with respect to the capture of the reflected beam throughout the beam measurement process, obtaining the parts of the reflector of the heliostat reflecting the sun or part of it in the pin-hole system, as they will be illuminated in the images, indicating the orientation of each point of their surface. The use of a pin-hole camera system in combination with the characterization device described above allows, in addition to capturing the beam reflected by the heliostat, determining the orientation of the reflector over the entire surface thereof, obtaining the exact shape and deformations with respect to the design shape thereof, and ultimately a more complete characterization of the heliostat compared with those that are obtained with the systems and methods of the state of the art only when the reflected beam is used.

A second object of the invention is a characterization system for characterizing the quality of heliostats according to claim 12. The system comprises at least one device according to that described above and associated with at least one heliostat in standby, i.e., a heliostat in a fixed or permanent position, with the movement motors off or disconnected, i.e., immobile, such that the light reflected in the heliostat strikes the device and the detectors forming it with a given and suitable angle, suitable being understood as that angle in which the optical system captures the incident light, i.e., when the angle formed between the optical axis of the detectors of the device and the main direction of the reflected beam is less than half the aperture angle of the optical system of each detector. Given the described situation, the heliostat remains immobile during the time it takes the beam to sweep across the device.

The devices of the system can have a global processor and calculation means for determining the complete image reflected by the heliostat which is generated by means of the scanning of the aligned sensors of each device as a result of the movement of the sun. The device or devices forming the system can be situated in different locations of the heliostat field or heliostat solar plant. Preferably the at least one device will be situated at the top of the heliostat solar plant or heliostat field tower to enable simultaneously characterizing as many heliostats as devices are arranged in the tower. Alternatively, the at least one device can be situated in any remote location, with respect to the tower, of a heliostat field or heliostat solar plant with the detectors suitably oriented, as mentioned above, such that it allows the characterization of said at least one heliostat.

This system obtains the complete image reflected by the heliostat generated by means of the scanning of the aligned sensors in the structure as a consequence of the movement of the sun and the continuous evolution of the orientations of the reflector of the heliostat, thereby characterizing the quality of the heliostat.

A third object of the invention is a characterization method for characterizing the quality of the heliostats according to claim 16. The method object of the invention comprises the following steps:

Arranging a device, according to the first object of the invention, in a location of a heliostat field, preferably in a heliostat solar plant with a tower, with at least two heliostats, Automatically selecting the gain of each of the detectors of the device for optimizing the noise signal as a function of intensity of the beam reflected in at least one heliostat and received by each of the detectors, The detectors of the device capturing and measuring the beam reflected in at least one heliostat which are in standby for a given time period, which is about 5 min per scan, Simultaneously taking captures with the pin-hole camera system in the event that the device incorporates such system, Normalizing the measurements taken by the detectors of the device for the estimation of the radiant energy on the device consisting of discounting the factor of the different gains in each capture, and Processing said measurements taken and reconstructing the beam reflected by the at least one heliostat. In the event of arranging a pin-hole camera system, the measurements taken with the captures of the pin-hole camera system would be combined to obtain the deformations and orientations of the reflector of the heliostat.

As has already been mentioned, at least one device can be situated in the tower of the heliostat solar plant, preferably at the top, although it can also be situated in other locations of the heliostat field provided that the reflected beam reaches the detectors with an angle included in the aperture angle thereof and allows the characterization of the heliostats or of any other reflective element that may be used in solar thermal technology.

DESCRIPTION OF THE DRAWINGS

The following figures showing a preferred embodiment of the invention in an illustrative and non-limiting manner are attached to the present description.

PREFERRED EMBODIMENT

Figure 1:
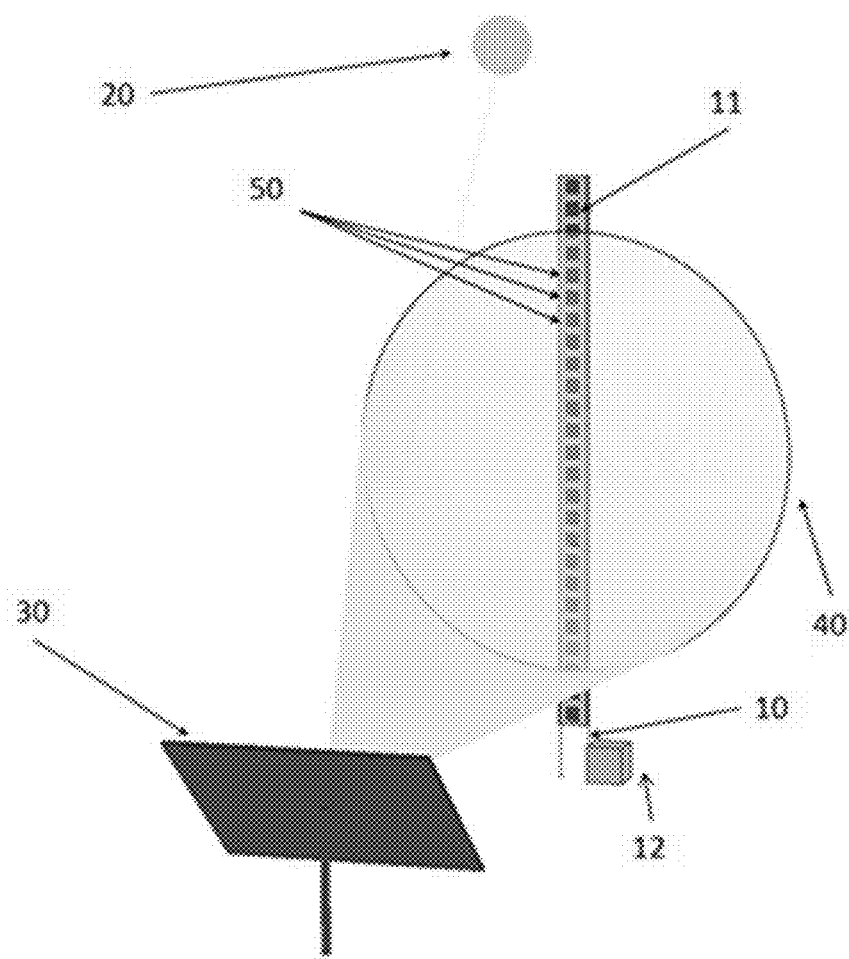
FIG. 1 shows a basic diagram of a system according to the invention with the characterization device for characterizing heliostats claimed.
Figure 7:
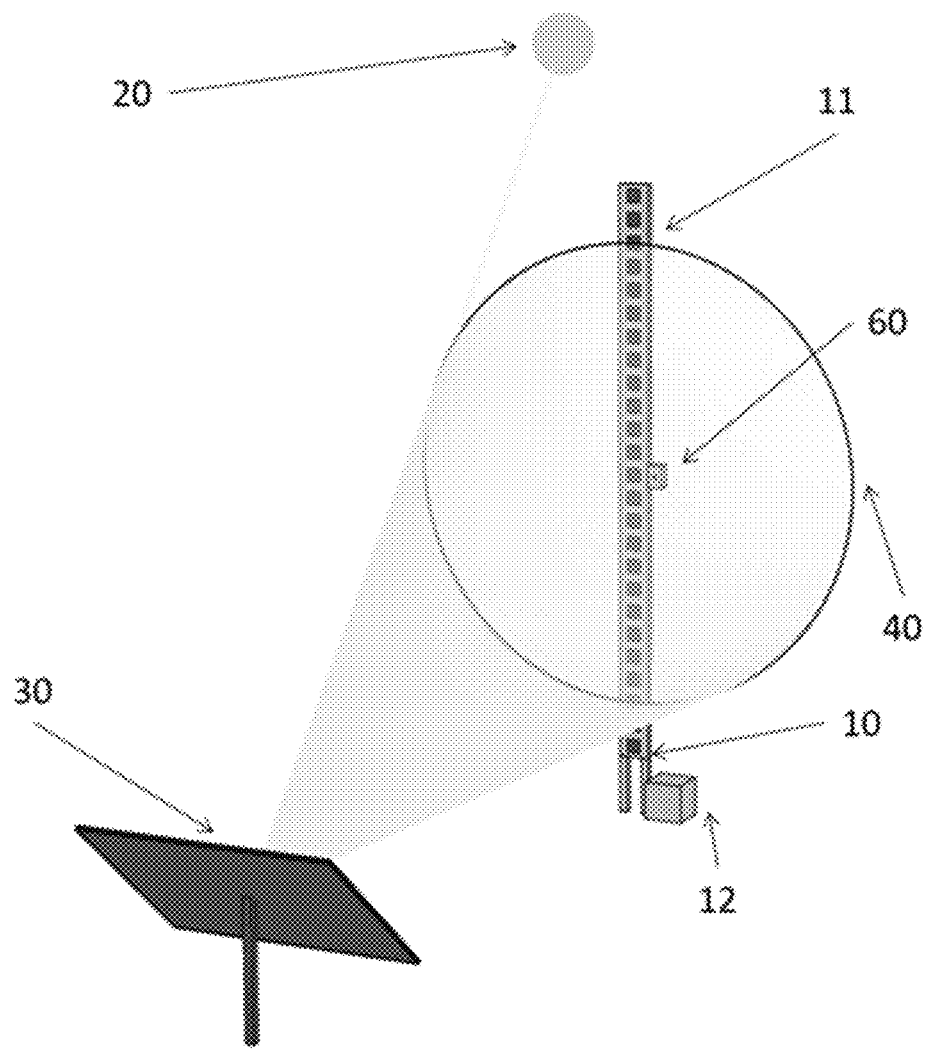
FIGS. 7 and 8 show FIGS. 1 and 2A with a pin-hole camera system.

FIG. 1 shows a system according to the present invention in which there can be observed an array or set of detectors 11, preferably up to 25 optical power detectors, which are preferably equidistantly placed in a device with a vertical structure or column 10 of, preferably, 15 meters in height. Optionally, as shown in FIG. 7, a pin-hole camera system 60 is incorporated in the device at the halfway point of the column, contiguous to the detectors and secured to said column. This pin-hole camera system preferably incorporates at least one pin-hole camera 60 (only one camera shown), although in alternative embodiments, the system can be made up of digital cameras, which are distributed in a vertical array contiguous to the detectors.

The light 40 reflected by the heliostat 30 to be characterized is detected by the detectors 50 for determining the pattern of the beam reflected by it. By using the movement of the beam 40 reflected by the heliostat 30 due to the continuous and known movement of the sun 20 and keeping the heliostat 30 immobile, the tracing of the distribution of the beam 40 reflected by the heliostat 30 that is obtained is horizontal. Simultaneously to the measurements taken, if the device comprises a pin-hole camera system, the at least one pin-hole camera 60 takes images in which the part of the heliostat that reflects the sun 20 or part of it is illustrated. In these images, the part of the heliostat that is correctly oriented is shown illuminated, as it is reflecting the sun 20, whereas the part that is poorly oriented remains dark.

In cases where the vertical dimension of the reflected beam 40 is greater than the height of the measurement column of the device, the beam 40 reflected by the vertical measurement column 1 is traced as many times as necessary. Assuming that it needs to be traced twice, the first trace is for measuring the lower part of the reflected beam 40, and subsequently a second trace (after having reoriented the heliostat 30 downwards and rendering it immobile to take the measurement) is for the upper part of the reflected beam 40.

The measurements taken by each detector 50 are captured and processed in real time (order of milliseconds) by the local processor or local processing and capture unit in each detector 55. The measurements taken can be sent to a global processor of the device 12 with a global control, capture, and processing unit located, preferably at the base of the column 10.

Figure 2A:
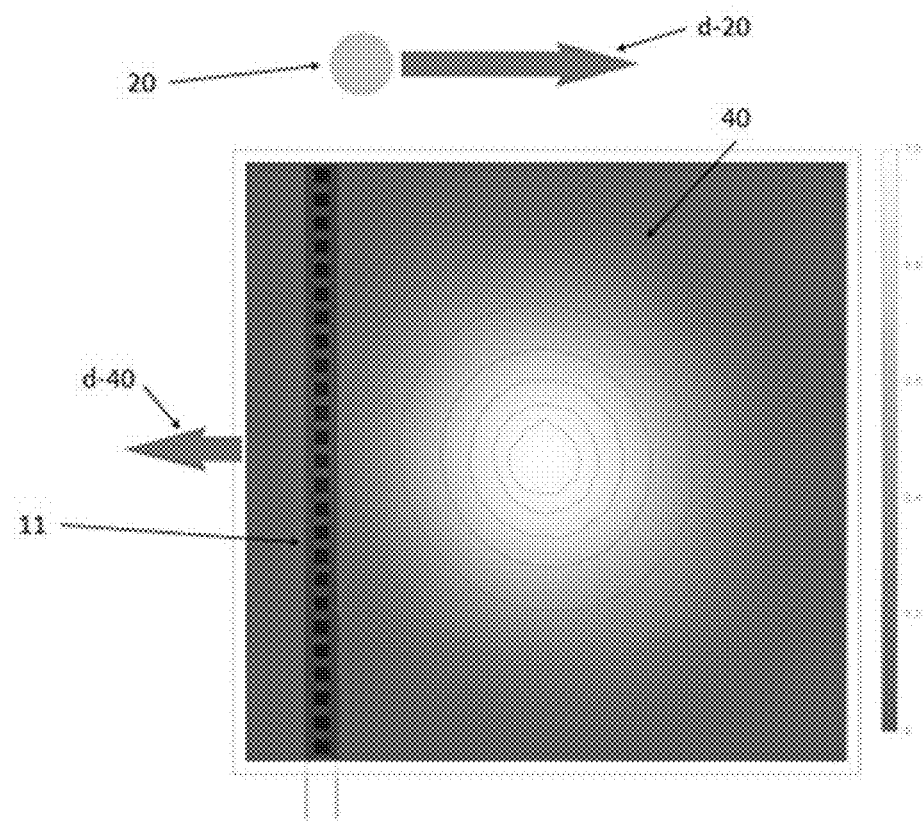
FIG. 2A shows a basic diagram of the movement of the sun and of the beam.
Figure 2B:
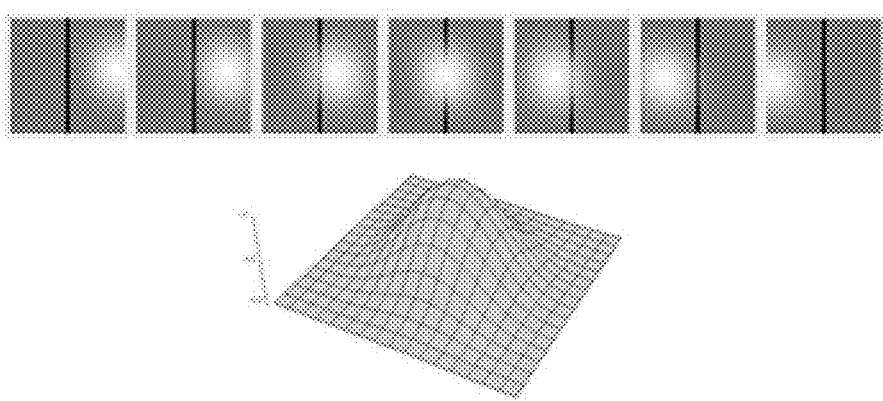
FIG. 2B shows a series of measurements during the movement of the reflected beam and the reconstruction of a reflected beam.

The horizontal sweeping of the beam across the array of detectors 11 due to the movement of the sun 20 (d-20) is described in a basic manner in FIG. 2A. As the sun 20 moves, the beam 40 reflected by the heliostat 30 passes over the characterization device, and the vertical distribution of the band of the beam 40 that is projected onto the detectors 50 each sampling time (FIG. 2B) is obtained. This figure shows, in the upper part, a series of measurements during the movement of the reflected beam and, in the lower part, a reconstruction of said reflected beam. Given that the movement and position of the sun 20 is known, by means of suitable calculation is outlined the complete shape of the beam 40 that will be formed by the vertical bands individually measured when the beam (d-40) passes over the array of detectors 11. The measurement time is determined by the size of the beam 40 and the traveling speed of the sun 20 (about 4.4 mrad per minute). For a measurement capacity below one second, the beam measurement formed by the set of measured vertical bands can be considered continuous. The complete shape of the beam is thereby reconstructed, as shown in FIG. 2B, and by means of analysis, the heliostat 30 can be characterized, which means preferably obtaining the global optical quality of the reflector.

Figure 8:
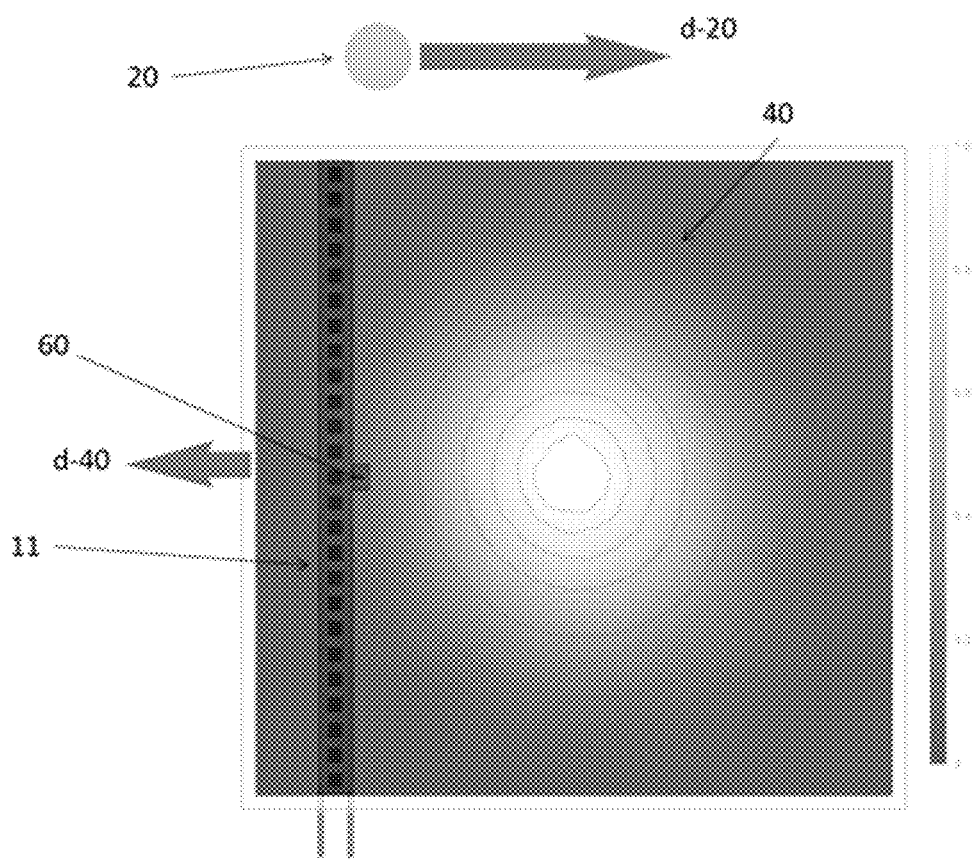

FIG. 8 shows an equivalent to FIG. 2A in which the device comprises a pin-hole camera system with at least one camera 60, such that by combining the reconstructed beam with the images taken by the pin-hole camera system, the orientation of all the points of the surface of the reflector and the deviation with respect to the design shape can be determined, achieving a more precise and detailed characterization.

Figure 3:
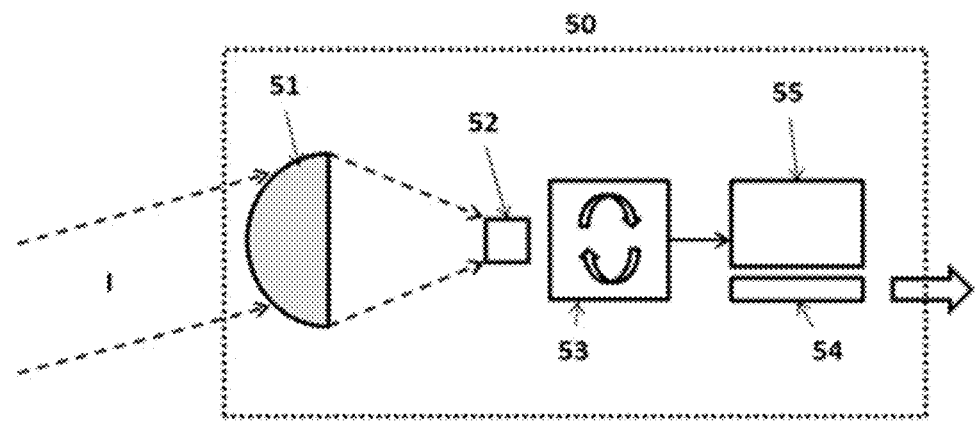
FIG. 3 shows a diagram of the components of a detector installed in a device object of the invention.

The characterization device included in the preceding system is formed by detectors 50 which capture the optical power (I) of the beam reflected in the heliostat which is incident on each of them. Each detector 50 is formed by an electronic detection part or automatic gain system 53, an optical detection part 51, and a data communication part 54. A basic diagram of the detector 50, including the local processor or local processing and capture unit 55 of the detector 50, is shown in FIG. 3.

Figure 4:
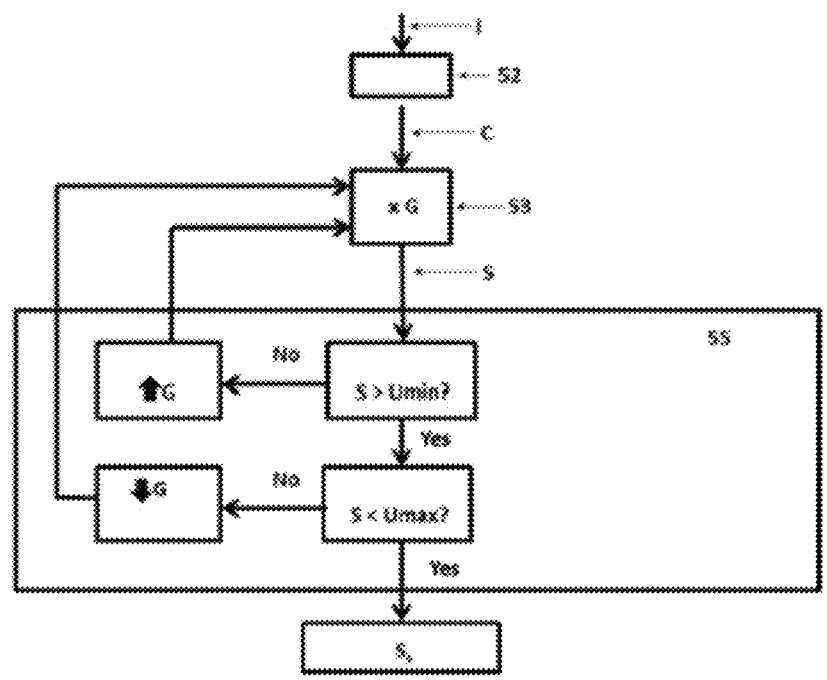
FIG. 4 shows a block diagram of the gain adjustment method performed by the detectors forming the device object of the invention.

The detection of each detector is preferably performed by means of an optical sensor 52 arranged in each detector 50. Said optical sensors 52 are preferably silicon photodiodes with a large surface area, although there may be sensors of another type that allow adjusting the gain, such as thermopiles, for example. The detection electronics or automatic gain system 53 takes the measurement of the continuous signal captured by the optical sensor 52 and includes a digital gain potentiometer which allows adjusting the gain (G) level of each detector 50 to the power level received by each detector 50 each sampling time. This is because beam power densities will vary greatly between the central area of the beam and its outer area (see FIG. 2). The adjustment of the gain (G) of each detector 50 to the level of signal received will determine the final measurement time of each vertical band. It is foreseeable that, given that the changes in power density will be slow, in the order of seconds, the gain adjustment algorithm will allow optimizing the signals of all the detectors in a time below one second, so there will be a measurement of each vertical band of the beam in times in the order of one second. A basic diagram of the measurement method of each detector, including the automatic gain adjustment, is reflected in FIG. 4.

After the optical sensor 52 detect the intensity (I) of the light beam, said automatic gain selection method comprises converting said intensity (I) to electric current (C) so as to measure the gain in the automatic gain system 53 the electric signal (S) of which is transmitted to the processor 55 of the detector 50. If said signal (S) is greater than a pre-established maximum threshold (Umax), an order to decrease the gain (G) is sent to the gain system 53, and if said signal (S) is less than a pre-established minimum threshold (Umin), an order to increase the gain (G) is sent to the automatic gain system 53. Once the gain (G) is adjusted, the electric signal (S) is saved ($S_s$).

In the preceding embodiment, the automatic gain selection system 53 of each detector 50 with a single optical sensor 52, preferably a photodiode or a thermopile, has variable-gain electronics selecting or adjusting in said sensor 52 the gain most suited to the light intensity (I) of the beam received by said sensor 52 or detector 50.

In an alternative embodiment of a detector with an automatic variable-gain system, the detector comprises several sensors, at least two, with each one being associated with a fixed gain, such that by means of the different sensors the dynamic measurement range required for the correct characterization of the heliostats is covered. In this case, the automatic gain system selects, from the at least two sensors, that sensor with the fixed gain most suited to the light intensity of the beam received by the sensors, i.e., the variable-gain of the system is determined by the arrangement of at least two fixed-gain sensors from which the electronics selects the most suitable sensor, allowing adaptations to different circumstances.

The other time of interest is the time of capture of the signals of all the detectors 50, which will be in the order of milliseconds in any situation. That is, once all the detectors 50 have selected or adjusted their gains (below one second) the signals of each detector 50 will be captured and measured in the time of milliseconds.

Figure 6:
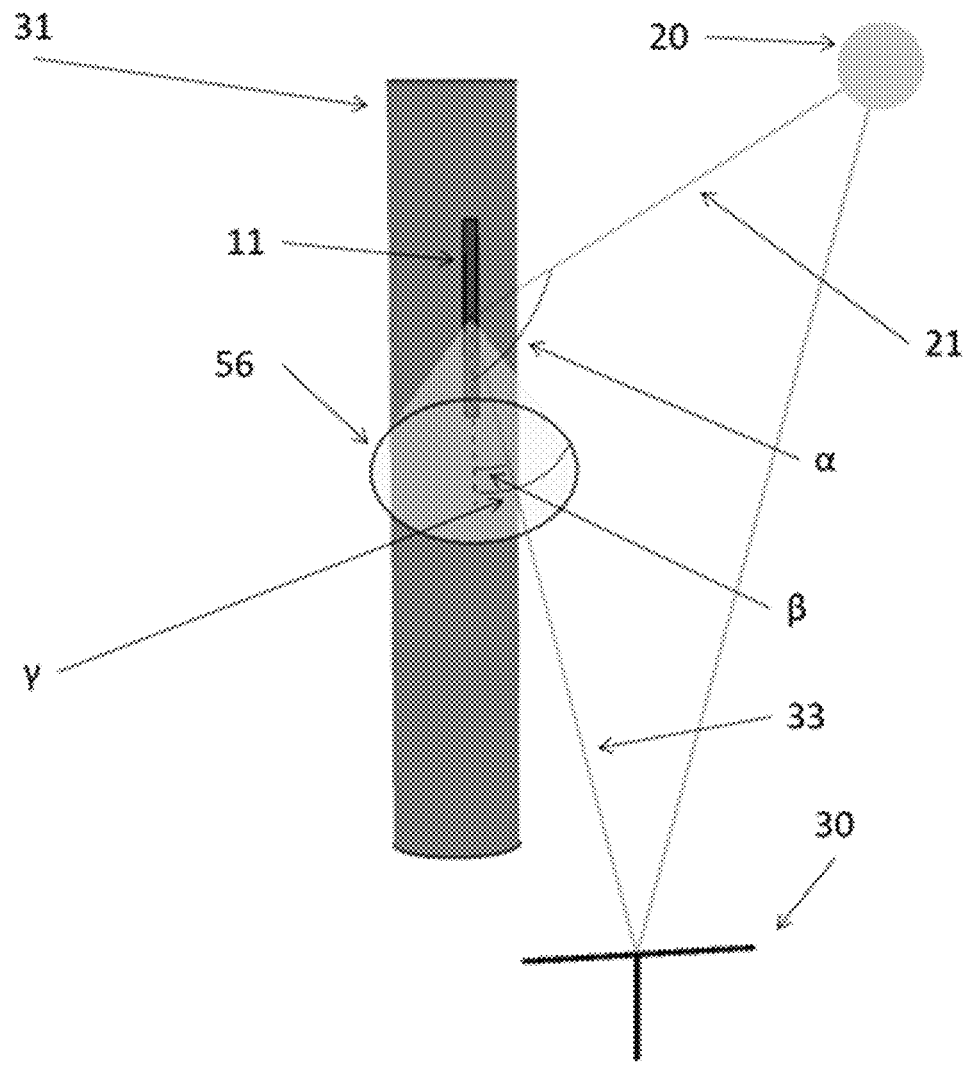
FIG. 6 shows the aperture angle of a detector of the device and how, as a result of it, capturing the rays coming directly from the sun is avoided.

The optical part of the detector 51 is made up of a lens with an aperture angle 56 preferably less than 15°, which allows reducing the background level captured due to scattered light, eliminating unwanted contributions, such as those from other heliostats, or that of the sun (for example, in heliostats located to the south). This situation is shown in FIG. 6, which depicts a plant in the northern hemisphere, where the heliostat 30, positioned to the south of the tower 31, reflects a sunray 33 on the characterization device 11 with an incidence angle ($\beta$) on it which is less than half the aperture angle ($\gamma$) of the detector 50, whereas the ray 21 coming directly from the sun 20, without being reflected in the heliostat 30, is also incident on the detectors 50, forming an angle ($\alpha$) with the optical axis of the detector 50 greater than half the aperture angle ($\gamma$) of the detector 50, so it is not captured by the sensor 52, thus preventing the occurrence of said light as noise in the measurement. In the methods and systems of the state of the art, this direct radiation of the sun cannot be avoided, making it impossible to correctly characterize the heliostat 30. At the same time, the optics of the detector 51 allows multiplying the detected optical power factor for increasing the useful detected signal level. With all this, the signal-to-background ratio is multiplied by a factor of 50-100 with respect to direct detection, such as one that may be carried out, for example, by a signal capture system by means of camera. So being able to also characterize heliostats 30 located far away, even more than 800 m away, is thus assured.

Lastly, the data communication electronics 54 allows acquiring the signals measured by each detector 50 and sending them to the global processor or global capture and global processing unit of the device 12, preferably located in the device, although it can be situated far from it, which is in charge of normalizing said measurements for the estimation of the radiant energy on the device or devices, in order to subsequently process the measurements and reconstruct the beam reflected by each heliostat.

As mentioned, the set 11 of detectors 50 will report the measured signals to the global processor of the device 12 preferably arranged in the actual structure of the device 10. Given that this global processor of the device 12 must work outdoors, it will be suitably conditioned for that purpose. As mentioned, the acquired signals may also be sent to a central data processing system which will be preferably a computer located in a comfortable area. The data will be treated by a suitable signal processing software, and the shape of the spatial distribution of the characterized beam will be graphically depicted, FIG. 2B, by means of the same or another suitable software having the interface functions necessary for the capture, saving, and editing thereof.

The column of detectors 11 will preferably have a mechanical securing system 10 preferably based on aluminum sections which allows stably reaching the same height as the distribution of detectors, for example 15 m. Said distance corresponds with the approximate diameter of the beam reflected by a heliostat at a distance of 800 m, for greater distances the beam will be gradually increased, making it necessary to make as many passes as necessary. Evidently, the size of the beam 40 as a function of distance is approximate and depends on the optical quality of the heliostat 30. In this system, the detection elements 50 and the feed and communication wiring for said elements will be arranged equally spaced from one another. The mechanical system 10 that is initially considered will allow collapsing or raising the measurement column 11. Therefore, during the times or days of activity, the measurement column 11 will be vertical and erected, secured by means of ropes conveniently anchored to the ground for withstanding the actions of the wind. Furthermore, during the times or days when testing is not performed, the measurement column 11 will be collapsed on the ground, laying in horizontal position on it and covered, for example, by a tarp, to prevent wearing or fouling of the column. Thus, the assembly of the column 10, its setting up, and maintenance or cleaning tasks can be performed comfortably working at ground level, without the need to work at heights. This will also allow performing the system calibration process in a simpler manner. The actions of erecting and collapsing the measurement column 11 would be performed by means of using a motor with a towrope suited to the weight and torque of the structure 10. The manner of assembling the vertical column and the wiring associated with the column will be such that it can be disassembled in several sections of length suitable for being transferred to and assembled in other locations. With the device 11 collapsed on the ground, a suitable optical system will allow a calibration process for the set of detectors 50 that is simple to perform.

Figure 5:
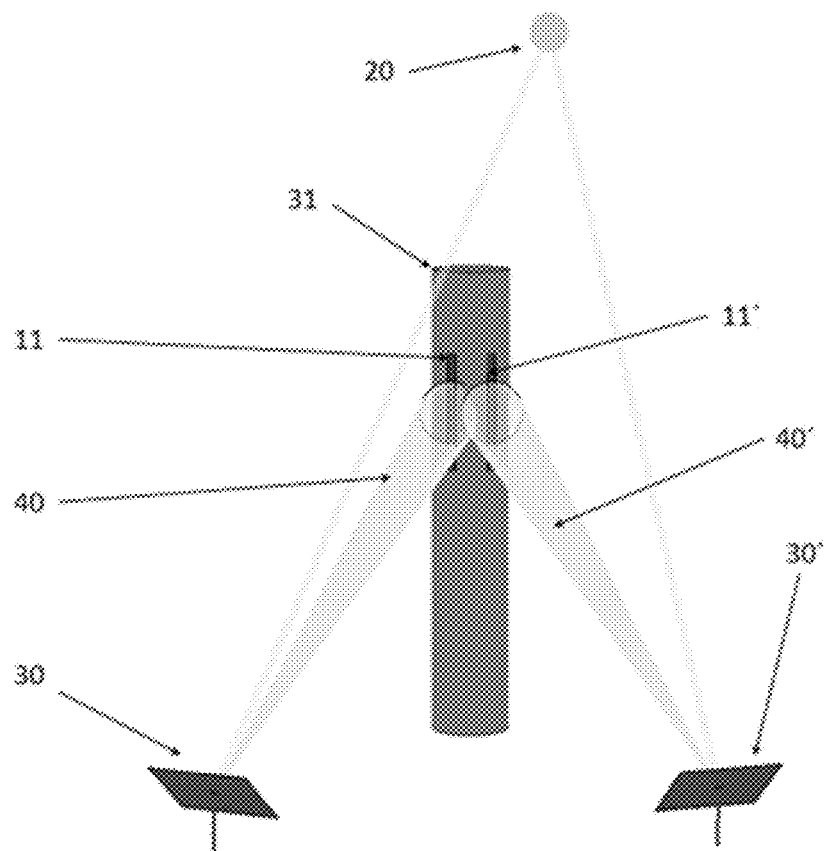
FIG. 5 shows a basic diagram of an embodiment of a system object of the invention.

Alternatively, FIG. 5 describes the preferred application of the device object of the invention located in the tower 31 of a tower solar plant. Thus, several devices 11, 11' coexist and characterize heliostats 30, 30' simultaneously through reflected beams 40, 40' in the same manner described above. As a result of the use of lenses in the detectors 50, the beams of the heliostats 30, 30' aimed at contiguous systems, do not affect one another or damage the measurements.

According to the systems described above, the characterization method for characterizing the quality of the beam reflected by a heliostat comprises the following steps:
a) Arranging a characterization device as described above,
b) Keeping the reflective element being characterized immobile and in standby for a given time sufficient for the beam to pass over the device as a result of the movement of the sun,
c) Automatically and continuously selecting the gain of each of the detectors of the device for the optimization of the noise signal as a function of intensity of the light beam reflected by the heliostat and received by each of said detectors,
d) The device capturing discrete measurements of the light reflected by the heliostat, which is in standby, over a given period of time as the beam sweeps across the device, in all those scans that are necessary,
e) Normalizing the measurements of the detectors of the device for the estimation of the radiant energy on the device, and
f) Processing the measurements taken and reconstructing the reflected beam, obtaining the complete shape thereof, the analysis and post-processing of which characterizes the heliostat, preferably its focal distance and optical quality.

As mentioned throughout the description and in step b), during the mentioned characterization method the heliostat is kept immobile and in standby the time necessary for the movement of the sun to cause the beam to be swept across the device. Prior to immobilizing the reflective element, the latter must be situated for the purpose of allowing the positioning of the reflected beam adjoined to the measurement device on the side and in the position favoring the beam to be swept across the entire measurement device as a consequence of the movement of the sun. Likewise, step d) can be repeated the times that are necessary until the beam reflected by the heliostat passes over the entire device. Additionally, after said step d), which is repeated as many times as is necessary, and before the step e), the method could be repeated from step b) in the event that several scans are necessary for completely characterizing the entire expanse of the beam.

The invention claimed is:

1. A characterization device for characterizing a shape and deformations of a surface of a reflective element through a combination of light beams reflected by the surface and images of the surface, the device comprising:
at least two variable-gain detectors for capturing the reflected light beams,
at least one pin-hole camera for taking images of the surface of the reflective element,
wherein the at least two variable-gain detectors and at least one pin-hole camera are located on a structure for receiving the light beams reflected by the reflective element, and
the device further comprising a processor unit that calculates an orientation of said surface and a deviation with respect to a design shape of said surface based on a combination of the reflected light beams and the images of the surface; and
wherein each of the at least two variable-gain detectors comprises:
a lens with an aperture angle smaller than 15° for increasing signal-to-noise ratio of the light beams,
at least one optical sensor on which the light beams captured by the lens are focused,
an automatic gain selection system, associated with the at least one optical sensor, with a data capture and processing unit, to select or adjust a gain of the variable-gain detector, in an automated manner, as a result of the data capture and processing unit, with respect to the light beams reflected by the surface of the reflective element, and
data communication means associated with the variable-gain detector;
wherein the automatic gain selection system comprises variable-gain electronics for selecting the gain of an optical sensor of the at least one optical sensor most suited to the light intensity of the light beam received by said at least one optical sensor.

2. The device according to claim 1, wherein the structure comprises the at least two variable-gain detectors aligned in an array.

3. The device according to claim 1, wherein the at least two variable-gain detectors are vertically aligned.

4. The device according to claim 1, wherein the at least two variable-gain detectors are horizontally aligned.

5. The device according to claim 1, wherein the automatic gain selection system comprises logarithmic-gain electronics.

6. The device according to claim 1, wherein the optical sensor is a silicon photodiode and/or a thermopile.

7. The device according to claim 1, comprising an automatic detector orientation system, such that either the structure support of the device moves, rotating and changing the orientation of all the at least two variable-gain detectors at the same time, or each of the at least two variable-gain detectors moves or rotates independently with respect to the structure of the device.

8. A characterization system for characterizing shapes of reflective elements, comprising:
a characterization device for characterizing a shape and deformations of a surface of a reflective element through a combination of light beams reflected by the surface and images of the surface, the characterization device comprising:
at least two variable-gain detectors for capturing the reflected light beams,
at least one pin-hole camera for taking images of the surface of the reflective element,
wherein the at least two variable-gain detectors and at least one pin-hole camera are located on a structure for receiving the light beams reflected by the reflective element, and
the device further comprising a processor unit that calculates an orientation of said surface and a deviation with respect to a design shape of said surface based on a combination of the reflected light beams and the images of the surface; and
wherein each of the at least two variable-gain detectors comprises:
a lens with an aperture angle smaller than 15° for increasing signal-to-noise ratio of the light beams, at least one optical sensor on which the light beams captured by the lens are focused, an automatic gain selection system, associated with the at least one optical sensor, with a data capture and processing unit, to select or adjust a gain of the variable-gain detector, in an automated manner, as a result of the data capture and processing unit, with respect to the light beams reflected by the surface of the reflective element, and data communication means associated with the variable-gain detector;

said characterization system further comprising:

at least one reflective element whose reflected light beam is incident on the at least two variable-gain detectors of the device with a given angle of view wherein the processor unit is configured to determine a complete shape of the surface of the reflective element through the images of the surface of the reflective element generated by scanning by the optical sensors of the device during movement of the sun, and the images captured by the pin-hole camera.

9. The system according to claim 8, comprising a plurality of the devices, wherein each device is located at a top of a tower of a solar plant, the solar plant having a plurality of the reflective elements, the system configured to simultaneously characterize the plurality of the reflective elements using the plurality of devices.

10. The system according to claim 8, comprising a plurality of reflective elements and wherein the at least one device is located in a field of the reflective elements with the at least two variably gain detectors of each device aligned with at least one of the plurality of reflective elements and wherein the aperture angle of each variable-gain detector is sized to that the at least one device is configured to characterize said at least one of the plurality of reflective elements.

11. A characterization method for characterizing a shape and deformations of a surface of a first reflective element by the quality of light reflected from the surface, comprising the following steps:

a) providing a characterization device for characterizing a shape and deformations of a surface of a reflective element through a combination of light beams reflected by the surface and images of the surface, the device comprising:

at least two variable-gain detectors for capturing the reflected light beams, at least one pin-hole camera for taking images of the surface of the reflective element, wherein the at least two variable-gain detectors and at least one pin-hole camera are located on a structure for receiving the light beams reflected by the reflective element, and the device further comprising a processor unit that calculates an orientation of said surface and a deviation with respect to a design shape of said surface based on a combination of the reflected light beams and the images of the surface; and wherein each of the at least two variable-gain detectors comprises:

a lens with an aperture angle smaller than 15° for increasing signal-to-noise ratio of the light beams, at least one optical sensor on which the light beams captured by the lens are focused, an automatic gain selection system, associated with the at least one optical sensor, with a data capture and processing unit, to select or adjust a gain of the variable-gain detector, in an automated manner, as a result of the data capture and processing unit, with respect to the light beams reflected by the surface of the reflective element, and data communication means associated with the variable-gain detector;

b) arranging the characterization device in a field of reflective elements comprising said first reflective element, c) keeping the first reflective element immobile, in a fixed position, during a time corresponding to a relative movement of the sun so that the light reflected by the first reflective element sweeps across the at least two variable-gain detectors in the characterizing device, d) selecting a gain of each of the detectors of the device for reducing noise signal as a function of intensity of the light reflected by the first reflective element and received by each of said at least two variable-gain detectors with a given angle, e) capturing and taking measurements, by the at least two variable-gain detectors of the device, the light reflected by the first reflective element while the first reflective element immobile, in a fixed, position, and continuously and simultaneously taking, by the pin-hole camera, images of the surface, f) normalizing the measurements taken by the at least two variable-gain detectors of the device for the estimation of radiant energy on the device, and g) processing said taken measurements, reconstructing the light beam reflected by the first reflective element, determining an orientation of the first reflective element over the entire surface of the first reflective element, and determining a shape and deformations relative to a design shape of the first reflective element.

12. A characterization device for characterizing a shape and deformations of a surface of a reflective element through a combination of light beams reflected by the surface and images of the surface, the device comprising:

at least two variable-gain detectors for capturing the reflected light beams, at least one pin-hole camera for taking images of the surface of the reflective element, wherein the at least two variable-gain detectors and at least one pin-hole camera are located on a structure for receiving the light beams reflected by the reflective element, and the device further comprising a processor unit that calculates an orientation of said surface and a deviation with respect to a design shape of said surface based on a combination of the reflected light beams and the images of the surface; and wherein each of the at least two variable-gain detectors comprises:

a lens with an aperture angle smaller than 15° for increasing signal-to-noise ratio of the light beams, at least one optical sensor on which the light beams captured by the lens are focused, an automatic gain selection system, associated with the at least one optical sensor, with a data capture and processing unit, to select or adjust a gain of the variable-gain detector, in an automated manner, as a result of the data capture and processing unit, with respect to the light beams reflected by the surface of the reflective element, and data communication means associated with the variable-gain detector;

wherein the automatic gain selection system comprises fixed-gain electronics for selecting an optical sensor, from the at least one optical sensor, with the gain most suited to the light intensity of the light beam received by the at least one optical sensor.

13. The device according to claim 12, wherein the optical sensors are at least two photodiodes and/or at least two thermopiles and/or at least one photodiode and at least one thermopile.

14. The device according to claim 12, wherein the structure comprises the at least two variable-gain detectors aligned in an array.

15. The device according to claim 12, wherein the at least two variable-gain detectors are vertically aligned.

16. The device according to claim 12, wherein the at least two variable-gain detectors are horizontally aligned.

17. The device according to claim 12, wherein the automatic gain selection system comprises logarithmic-gain electronics.

18. The device according to claim 12, comprising an automatic detector orientation system, such that either the structure support of the device moves, rotating and changing the orientation of all the at least two variable-gain detectors at the same time, or each of the at least two variable-gain detectors moves or rotates independently with respect to the structure of the device.

* * * * *